(12) United States Patent
Pandey et al.

(10) Patent No.: US 11,487,789 B2
(45) Date of Patent: Nov. 1, 2022

(54) GENERATING MULTIDIMENSIONAL DATABASE QUERIES

(71) Applicant: Oracle International Corporation, Redwood Shores, CA (US)

(72) Inventors: Prashant Pandey, Jhansi (IN); Eakta Aggarwal, Hyderabad (IN); Richard Yungning Liu, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 611 days.

(21) Appl. No.: 16/394,645

(22) Filed: Apr. 25, 2019

(65) Prior Publication Data

US 2020/0097490 A1 Mar. 26, 2020

Related U.S. Application Data

(60) Provisional application No. 62/733,913, filed on Sep. 20, 2018.

(51) Int. Cl.
| | |
|---|---|
| *G06F 16/00* | (2019.01) |
| *G06F 16/28* | (2019.01) |
| *G06F 16/248* | (2019.01) |
| *G06F 16/242* | (2019.01) |
| *G06F 16/22* | (2019.01) |

(52) U.S. Cl.
CPC ........ *G06F 16/283* (2019.01); *G06F 16/2264* (2019.01); *G06F 16/248* (2019.01); *G06F 16/2423* (2019.01)

(58) Field of Classification Search
None
See application file for complete search history.

(56) References Cited

U.S. PATENT DOCUMENTS

| | | | | |
|---|---|---|---|---|
| 5,675,819 A | * | 10/1997 | Schuetze | G06F 40/253 704/10 |
| 2014/0280314 A1 | * | 9/2014 | Coleman | G06F 16/21 707/769 |
| 2015/0154275 A1 | * | 6/2015 | Senart | G06F 16/254 707/605 |
| 2015/0186504 A1 | * | 7/2015 | Gorman | G06F 40/30 707/752 |
| 2017/0039281 A1 | | 2/2017 | Venkata et al. | |

* cited by examiner

*Primary Examiner* — Alexander Khong
(74) *Attorney, Agent, or Firm* — Invoke

(57) ABSTRACT

Techniques for generating a multidimensional database query are disclosed. A system receives a user-supplied natural language query and performs natural language processing to extract a literal from the natural language query. The system performs a lookup of the literal in one or more dictionary data structures associated with a multidimensional database, to determine that the literal is associated with a particular dimension of multiple dimensions in the multidimensional database. The system performs a lookup of the literal and the dimension in the one or more dictionary data structures, to determine that the literal is associated with a particular member of the dimension. The system generates a multidimensional database query to satisfy the user-supplied natural language query. The multidimensional database query includes a query clause that references the particular member of the dimension.

20 Claims, 16 Drawing Sheets

Outline View
402

FIG. 4B

User-Supplied Natural Language Query 404

What are my expenditures for travel and entertainment in America?

FIG. 4C

Processed Natural Language Query 406

| Token | Grammar | Lemma |
|---|---|---|
| what | WP | what |
| my | PRP$ | my |
| expenditures | NN | expense |
| for | IN | for |
| travel | NN | travel |
| and | CC | and |
| entertainment | NN | entertainment |
| in | IN | In |
| america | NN | America |

FIG. 4F

Matching members for literal "travel" 412

| Dimension | Member Name | Member Description | Account Type | Score |
|---|---|---|---|---|
| Account | 53000 | Total Travel and Entertainment | Expense | 0.2 |
| Account | 53450 | Total Domestic and International Travel | Expense | 0.16 |
| Account | 53440 | Travel - Overseas | Expense | 0.33 |
| Account | 53456 | Travel Advance Return | Expense | 0.25 |
| Account | 53430 | Travel - Domestic | Expense | 0.33 |

Parent members for literal "travel" 414

| Dimension | Member Name | Member Description | Account Type | Score |
|---|---|---|---|---|
| Account | 53000 | Total Travel and Entertainment | Expense | 0.2 |

Matching members for literal "entertainment" 416

| Dimension | Member Name | Member Description | Account Type | Score |
|---|---|---|---|---|
| Account | 53000 | Total Travel and Entertainment | Expense | 0.2 |
| Account | 52388 | Entertainment | Expense | 0.5 |

Parent members for literal "entertainment" 418

| Dimension | Member Name | Member Description | Account Type | Score |
|---|---|---|---|---|
| Account | 53000 | Total Travel and Entertainment | Expense | 0.2 |

Matching members for literal "america" 420

| Dimension | Member Name | Member Description | Score |
|---|---|---|---|
| Location | 1000 | North America | 0.33 |
| Location | 2000 | South America | 0.33 |

Parent members for literal "america" 422

| Dimension | Member Name | Member Description | Score |
|---|---|---|---|
| Location | 1000 | North America | 0.33 |
| Location | 2000 | South America | 0.33 |

Top-scoring members for each literal
424

| Dimension | Member Name | Member Description | Account Type | Score |
|---|---|---|---|---|
| Account | 53000 | Total Travel and Entertainment | Expense | 0.2 |

| Dimension | Member Name | Member Description | Account Type | Score |
|---|---|---|---|---|
| Account | 53000 | Total Travel and Entertainment | Expense | 0.2 |

| Dimension | Member Name | Member Description | Score |
|---|---|---|---|
| Location | 1000 | North America | 0.33 |
| Location | 2000 | South America | 0.33 |

FIG. 4J

Multidimensional database query
426

```
WITH set [_AccountingPeriod] as
'Filter([AccountingPeriod].members,
([AccountingPeriod].CurrentMember.MEMBER_ALIAS = "Jan-18"))'
set [_Currency] as 'Filter([Currency].members,
(([Currency].CurrentMember.MEMBER_Name = "USD" OR
[Currency].CurrentMember.MEMBER_ALIAS = "USD")))' set
[_Ledger] as 'Filter([Ledger].members,
(([Ledger].CurrentMember.MEMBER_Name = "Vision Foods - USA
Ledger" OR [Ledger].CurrentMember.MEMBER_ALIAS = "Vision
Foods - USA Ledger")))' set [_Account] as
'Filter(Generate({[Account]},[Account].members), (
([Account].CurrentMember.MEMBER_Name = "53000" OR
[Account].CurrentMember.MEMBER_ALIAS = "53000") ))' set
[_Location] as
'Filter(Generate({[Location]},[Location].members), (
([Location].CurrentMember.MEMBER_Name = "1000" OR
[Location].CurrentMember.MEMBER_ALIAS = "1000") OR
([Location].CurrentMember.MEMBER_Name = "2000" OR
[Location].CurrentMember.MEMBER_ALIAS = "2000") ))' select {
[Balance Amount].[Ending Balance]} on columns,NON EMPTY
{crossjoin({[_AccountingPeriod]}, crossjoin({[_Account]},
crossjoin({[_Location]}, crossjoin({[_Ledger]},
{[_Currency]}) ) ) )} properties MEMBER_NAME, GEN_NUMBER,
MEMBER_ALIAS on rows FROM [VF_USA_Accounting_Flexfie.db]
``` though a wizard may help to structure the process of generating an MDDB query, a user still requires knowledge of the underlying technology and database structure to use the wizard. For example, a user

GENERATING MULTIDIMENSIONAL DATABASE QUERIES

BENEFIT CLAIMS; RELATED APPLICATIONS; INCORPORATION BY REFERENCE

This application claims the benefit of U.S. Provisional Patent Application 62/733,913, filed Sep. 20, 2018, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to multidimensional databases. In particular, the present disclosure relates to multidimensional database queries.

BACKGROUND

In computer systems, a relational database stores data in data structures called tables. Each table includes one or more rows and columns. A row in a table represents a particular record, with data for that record stored in the corresponding column(s). A record in one table may reference (i.e., relate to) a record in another table, using a system of private and foreign keys. To access data in a relational database, a user prepares a query in a query language such as Structured Query Language (SQL). The complexity of relational database queries increases significantly as the number of related tables increases.

In a multidimensional database ("MDDB"), data is represented as a hypercube or multidimensional array. A hypercube has multiple dimensions. Each dimension corresponds to a different index into the data. As one example, an MDDB stores employee data. In this example, the different dimensions may include "Employee," "Department," and "Salary." The different dimensions may be visualized as the axes of a cube. An MDDB may have any number of dimensions. A particular data value within an MDDB may be referred to as a member.

An MDDB query is a set of instructions, conforming to a particular query format specified by an MDDB, for retrieving data from the MDDB. When applied to the MDDB, the MDDB query filters data across one or more dimensions of the MDDB. Using the example above, an MDDB query may retrieve data corresponding to all the employees in a department, all employees earning a salary within a particular salary range, the total employee salary expenditure within a particular department, all departments that have employees earning above a particular salary, etc. MDDB's allow for complex queries that are difficult or impossible to express in queries directed to relational databases.

To prepare an MDDB query, a user may write the query manually. Manually writing an MDDB query requires the user to have a considerable amount of knowledge of the underlying technology and database structure, including the query language syntax and the different dimensions stored in the database. Alternatively, a user may access a user interface that provides a set of predetermined options for constructing an MDDB query. The user interface may include checkboxes, dropdown menus, and/or other controls that allow the user to select from available data sets, filters, etc. A user interface with a set of predetermined options may be referred to as a 'wizard.' Although a wizard may help to structure the process of generating an MDDB query, a user still requires knowledge of the underlying technology and database structure to use the wizard. For example, a user must understand the concept of an MDDB dimension to prepare a query that accesses the correct dimension(s). In addition, because a wizard presents a set of predetermined options, the wizard may not allow the user to construct the exact query desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 4A-4K show block diagrams that illustrate examples of generating a multidimensional database query in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. Architectural Overview
3. Generating Dictionary Data Structures
4. Generating a Multidimensional Database Query
5. Illustrative Example
6. Miscellaneous; Extensions
7. Hardware Overview
8. Computer Networks and Cloud Networks
9. Microservice Applications
1. General Overview A multidimensional database query filters data across one or more indices, referred to herein as dimensions, into a multidimensional database. One or more embodiments relate to generating multidimensional database queries based on user-supplied natural language queries and dictionary data structures. A user-supplied natural language query includes literals that may be used for performing lookups across dictionary data structures. Dictionary data structures map such user-supplied literals, associated with at least one member of a dimension, to that dimension. Dictionary data structures further map combinations of (a) user-supplied literals and (b) a specified dimension to members of the specified dimension. The system combines members from different dimensions to generate multidimensional database queries.

In an embodiment, natural language processing allows the system to determine non-trivial literals supplied by the user and perform lookups in the dictionary data structure(s) to determine which members are relevant to the natural language query. The dictionary data structure(s) may also include importance scores associated with literal-to-member mappings. The importance scores may allow the system to generate a multidimensional database query that returns more relevant results than if importance scores were not used.

One or more embodiments described in this Specification and/or recited in the claims may not be included in this General Overview section.

2. Architectural Overview

Figure 1:
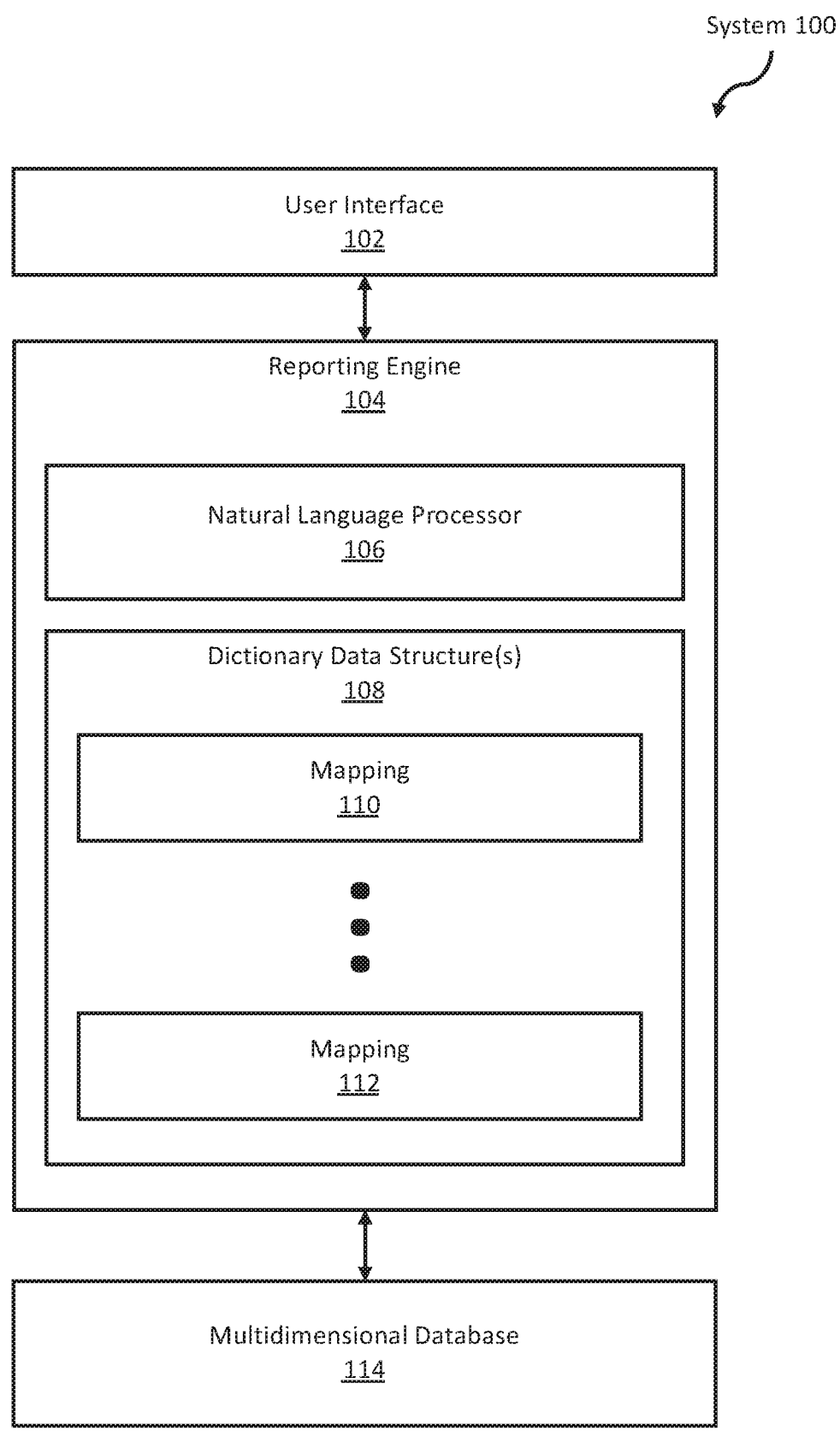
FIG. 1 shows a block diagram that illustrates a system in accordance with one or more embodiments.

FIG. 1 shows a block diagram that illustrates a system 100 in accordance with one or more embodiments. As illustrated in FIG. 1, system 100 includes a user interface 102, a reporting engine 104, a multidimensional database 114, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In one or more embodiments, a user interface 102 refers to hardware and/or software configured to facilitate communications between a user and a reporting engine 104. The user interface 102 renders user interface elements and receives input via user interface elements. Examples of a user interface 102 include, but are not limited to: a graphical user interface (GUI); a command line interface (CLI); a haptic interface; and/or a voice command interface. Examples of user interface elements include, but are not limited to: checkboxes; radio buttons; dropdown lists; list boxes; buttons; toggles; text fields; date and time selectors; command lines; sliders; pages; and/or forms. In an embodiment, the user interface 102 includes one or more user interface elements that allow a user to submit a natural language query to the reporting engine 104. For example, the user interface 102 may include a textbox configured to receive a natural language query as input.

In an embodiment, different components of the user interface 102 are specified in different languages. The behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, components of the user interface 102 may be specified in one or more other languages, such as Java, C, or C++.

In an embodiment, a reporting engine 104 refers to hardware and/or software configured to perform operations described herein for generating a multidimensional database ("MDDB") query. Examples of operations for generating an MDDB query are described below. Specifically, in an embodiment, the reporting engine 104 is configured to receive a natural language query, supplied by a user via the user interface 102, and generate an MDDB query based on the user-supplied natural language query.

In an embodiment, the reporting engine 104 includes a natural language processor 106 configured to extract one or more literals from the user-supplied natural language query. The reporting engine 104 performs one or more lookups of the user-supplied literal(s) in one or more dictionary data structures 108. The dictionary data structure(s) 108 include(s) mappings 110, 112 that associate non-trivial literals with dimensions and/or members of a multidimensional database 114. The dictionary data structure(s) 108 may be stored as extensible markup language (XML), JavaScript Object Notation (JSON), objects in an object-oriented programming language, records or members in a database, or any other kind of data structure or combination thereof.

In an embodiment, the dictionary data structure(s) 108 include(s) a dimension description dictionary. A dimension description dictionary maps each dimension in a multidimensional database 114 to a list of non-trivial literals associated with members of that dimension. An example of a dimension description dictionary is described below.

In an embodiment, the dictionary data structure(s) 108 include(s) a dimension members dictionary. A dimension members dictionary maps, for non-trivial literals associated with one or more dimensions in a multidimensional database 114, each particular literal to the particular member(s) associated with that literal (e.g., the member(s) that have the literal in their name, alias, and/or a user-defined attribute). In addition, the dimension members dictionary may include, for each literal-to-member mapping, a corresponding importance score. An example of a dimension members dictionary is described below.

In an embodiment, a dimension description dictionary and a dimension members dictionary are stored as separate data structures. Alternatively, a dimension description dictionary and a dimension members dictionary may be stored as a single data structure. For example, referring to the examples shown in Appendix A and Appendix B hereto, the XML of Appendix A may be modified to include the literal-to-member mappings of Appendix B. Many different kinds and/or configurations of dictionary data structure(s) 108 may be used.

In an embodiment, based on the result(s) of the lookup(s) to the dictionary data structure(s) 108, the reporting engine 104 generates an MDDB query. In an embodiment, the reporting engine 104 applies the MDDB query to a multidimensional database 114, to obtain a result of the user-supplied natural language query. The reporting engine 104 may generate a visual report, based on the result. The reporting engine 104 may present the visual report to a user via the user interface 102.

In an embodiment, a multidimensional database ("MDDB") 114 is any kind of multidimensional database. Examples of multidimensional databases include, but are not limited to: Oracle Essbase™, IBM Cognos™ TM1, SAP Business Warehouse (BW)™, and Microsoft Analysis Services™. The MDDB 114 may include multiple different storage units and/or devices. The multiple different storage units and/or devices may or may not be of the same type or located at the same physical site. Further, an MDDB 114 may be implemented or may execute on the same computing system as one or more other components illustrated in FIG. 1. Alternatively or additionally, an MDDB 114 may be implemented or executed on a computing system separate from one or more other components illustrated in FIG. 1. An MDDB 114 may be communicatively coupled to one or more other components illustrated in FIG. 1 (e.g., the reporting engine 104) via a direct connection or via a network.

In an embodiment, components illustrated in FIG. 1 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Generating Dictionary Data Structures

Figure 2A:
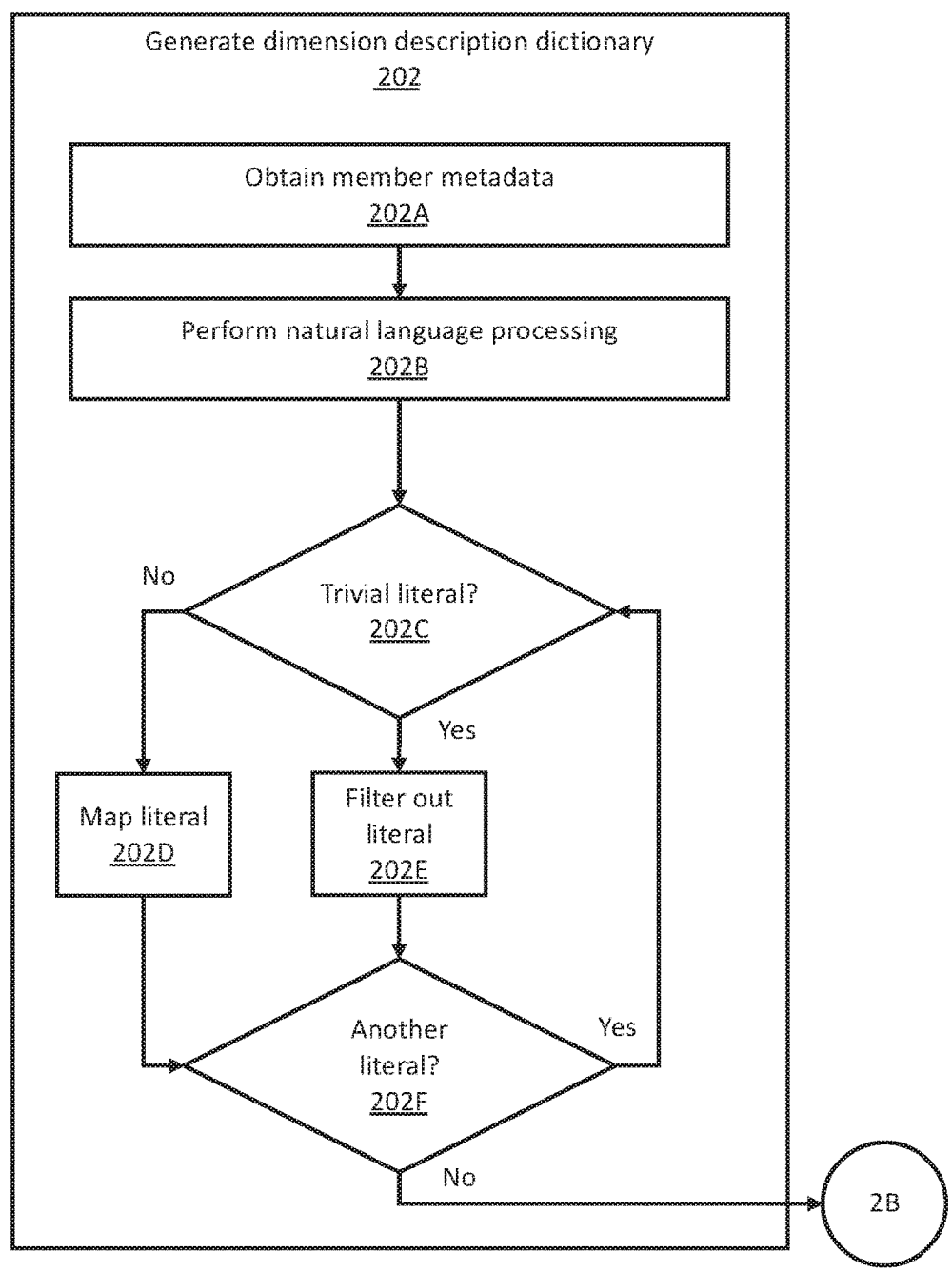
FIGS. 2A-2B illustrate a set of operations for generating dictionary data structures in accordance with one or more embodiments.
Figure 2B:
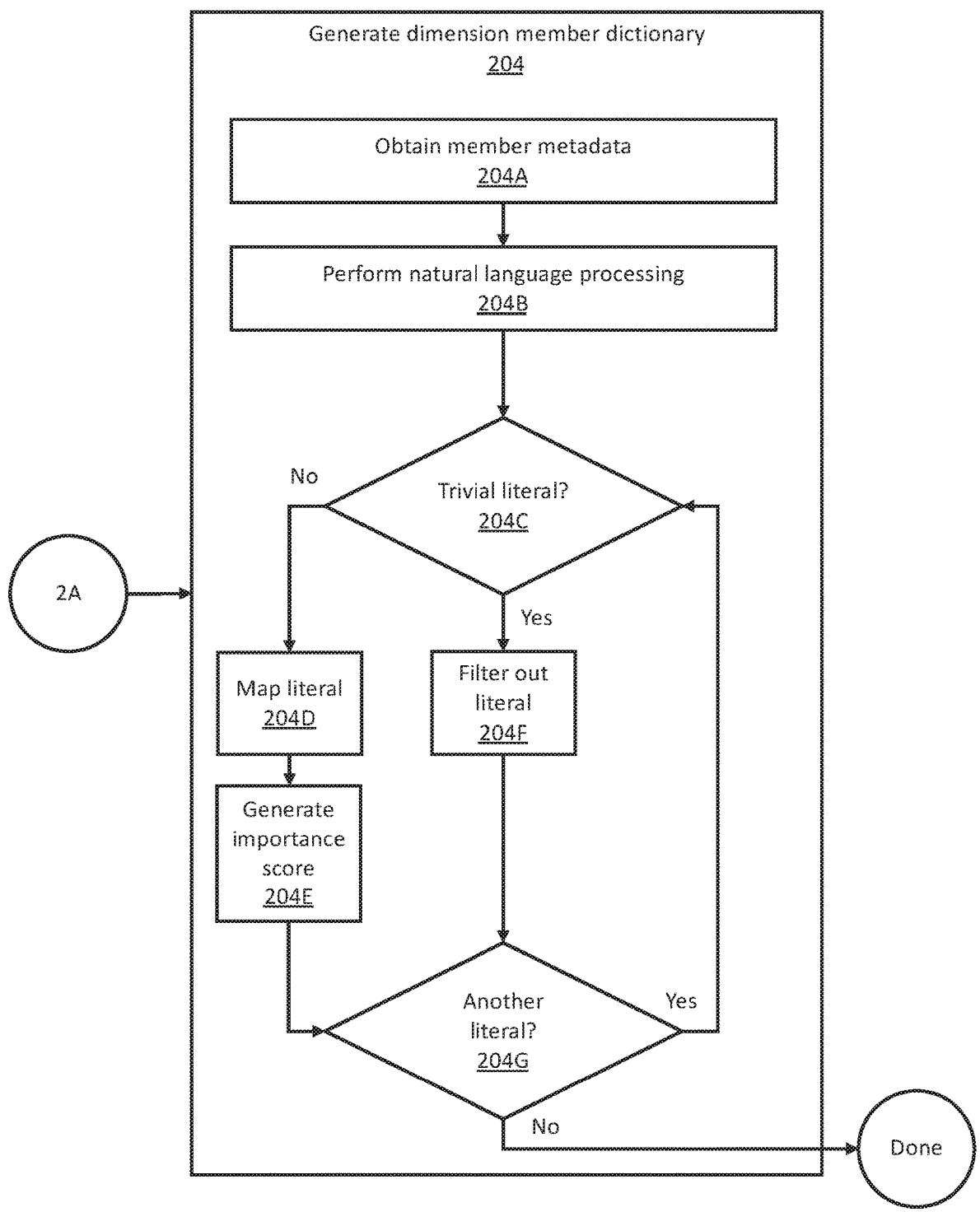

FIGS. 2A-2B illustrate an example set of operations for generating dictionary data structures in accordance with one or more embodiments. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

In an embodiment, a system (e.g., system 100 of FIG. 1) generates one or more dictionary data structures (e.g., the dictionary data structure(s) 108 of FIG. 1) based on contents of an MDDB. The system may generate the dictionary data structure(s) by scanning an MDDB outline and constructing the dictionary data structure(s) based on the MDDB outline. If the MDDB outline is a tree structure, the system may use a depth-first or breadth-first scan. The dictionary data structure(s) is/are configured to allow lookups to determine which member(s) of which dimension(s) include one or more particular literals. The dictionary data structure(s) may include a dimension description dictionary and/or a dimension members dictionary, as described below.

In an embodiment, the system generates a dimension description dictionary (Operation 202). The dimension description dictionary maps each dimension in the MDDB to a list of non-trivial literals associated with members of that dimension. Appendix A, incorporated herein by reference in its entirety, shows an example of a dimension description dictionary in accordance with an embodiment.

In an embodiment, to generate a dimension description dictionary, the system obtains metadata associated with each member in a dimension (Operation 202A). The metadata may include, but is not limited to: the member's name; the member's alias; and/or any user-defined attributes associated with the member. The system may perform natural language processing on the metadata (Operation 202B). Natural language processing may involve, for each literal in the metadata, generating a corresponding token, part of speech, and lemma (i.e., stemmed token). Based on the natural language processing, the system may determine whether a particular literal is a trivial literal (Operation 202C). For example, the system may determine that literals corresponding to particular parts of speech, such as conjunctions and/or prepositions, are trivial literals. Alternatively or in addition, the system may determine that a literal is a trivial literal because it does not have sufficient contextual significance. If the system determines that a literal is not a trivial literal, then the system may retain the non-trivial literal for the dimension description dictionary. The system may map the literal, in the dimension description dictionary, to the corresponding dimension associated with that literal (Operation 202D). If the system determines that a literal is a trivial literal, then the system may filter out the trivial literal (Operation 202E). The system may determine whether the metadata includes another literal (Operation 202F) and repeat the filtering process for each literal until all literals have been evaluated as being trivial or non-trivial.

In an embodiment, the system generates the dimension description dictionary according to the following pseudo-code.

```
Step 1: Connect to MDDB and export the MDDB outline
Step 2: Load the MDDB outline in memory
Step 3: For every dimension
BEGIN LOOP
    For every member
    BEGIN LOOP
        Get member name, alias, user-defined attributes
        Generate tokens, parts-of-speech, and lemmas
        Filter out trivial lemmas based on parts-of-speech
        Add remaining non-trivial lemmas to this dimension's
        lemma list
    END LOOP
END LOOP
Step 4: Write the dimension description dictionary to XML
```

In an embodiment, the system generates a dimension members dictionary (Operation 204). The dimension members dictionary maps, for the non-trivial literals associated with each dimension, each particular literal to the particular member(s) associated with that literal (e.g., the member(s) that have the literal in their name, alias, and/or a user-defined attribute). In addition, the dimension members dictionary may include, for each literal-to member mapping, a corresponding importance score. Importance scores are discussed in further detail below. Appendix B, incorporated herein by reference in its entirety, shows an example of a dimension members dictionary in accordance with an embodiment.

In an embodiment, to generate a dimension members dictionary, the system obtains metadata associated with each member in a dimension (Operation 204A). The metadata may include, but is not limited to: the member's name; the member's alias; and/or any user-defined attributes associated with the member. The system may perform natural language processing on the metadata (Operation 204B). Natural language processing may involve, for each literal in the metadata, generating a corresponding token, part of speech, and lemma (i.e., stemmed token). Based on the natural language processing, the system may determine whether a particular literal is a trivial literal (Operation 204C). For example, the system may determine that literals corresponding to particular parts of speech, such as conjunctions and/or prepositions, are trivial literals. Alternatively or in addition, the system may determine that a literal is a trivial literal because it does not have sufficient contextual significance. If the system determines that a literal is not a trivial literal, then the system may retain the non-trivial literal for the dimension member dictionary. Specifically, the system may map the literal, in the dimension member dictionary, to the corresponding member associated with that literal (Operation 204D).

In an embodiment, the system generates, for each retained literal-to-member mapping, a corresponding importance score (Operation 204E). An importance score is a measure or approximation of the strength of a relationship between a particular member and a particular literal. In an embodiment, given a set of non-trivial literals associated with a particular member, the importance score for a particular literal is a ratio of (a) the number of occurrences of the particular literal in the set of non-trivial literals associated with the particular member to (b) the total number of literals in the set of non-trivial literals. In the example shown in Appendix B, the importance score is a ratio of the number of occurrences of the particular literal to the number of non-trivial literals in the member's description and user-defined attribute(s). Note that in Appendix B, only the member's description is included in the XML; the scores also take into account user-defined attributes that are not included in the XML.

In an embodiment, if the system determines that a literal is a trivial literal, then the system filters out the trivial literal (Operation 204F). The system may determine whether the metadata includes another literal (Operation 204G) and repeat the filtering process for each literal until all literals have been evaluated as being trivial or non-trivial.

In an embodiment, the system generates the dimension members dictionary according to the following pseudocode.

```
Step 1: Load the MDDB outline in memory
Step 2: For every dimension
BEGIN LOOP
    For every member
    BEGIN LOOP
        Get member name, alias, user-defined attributes
        Generate tokens, parts-of-speech, and lemmas
        Filter out trivial lemmas based on parts-of-speech
        For every lemma
        BEGIN LOOP
            If member mapping exists for this lemma,
            add this member to the list
            Else add this member to a new member
            mapping for this lemma
        END LOOP
        Add lemmas-members mapping to this dimension
    END LOOP
END LOOP
Step 4: Write the dimension members dictionary to XML
```

In an embodiment, one or more operations used to generate a dimension description dictionary overlap with one or more operations used to generate a dimension members dictionary. In the pseudocode examples above, both processes involve loading the MDDB outline in memory, iterating through each member of each dimension, performing natural language processing on the metadata associated with each member, and filtering out trivial lemmas. To improve system performance, rather than repeating operations that overlap, each operation may be performed once and used to generate both the dimension descriptions dictionary and the dimension members dictionary.

4. Generating a Multidemensional Database Query

Figure 3A:
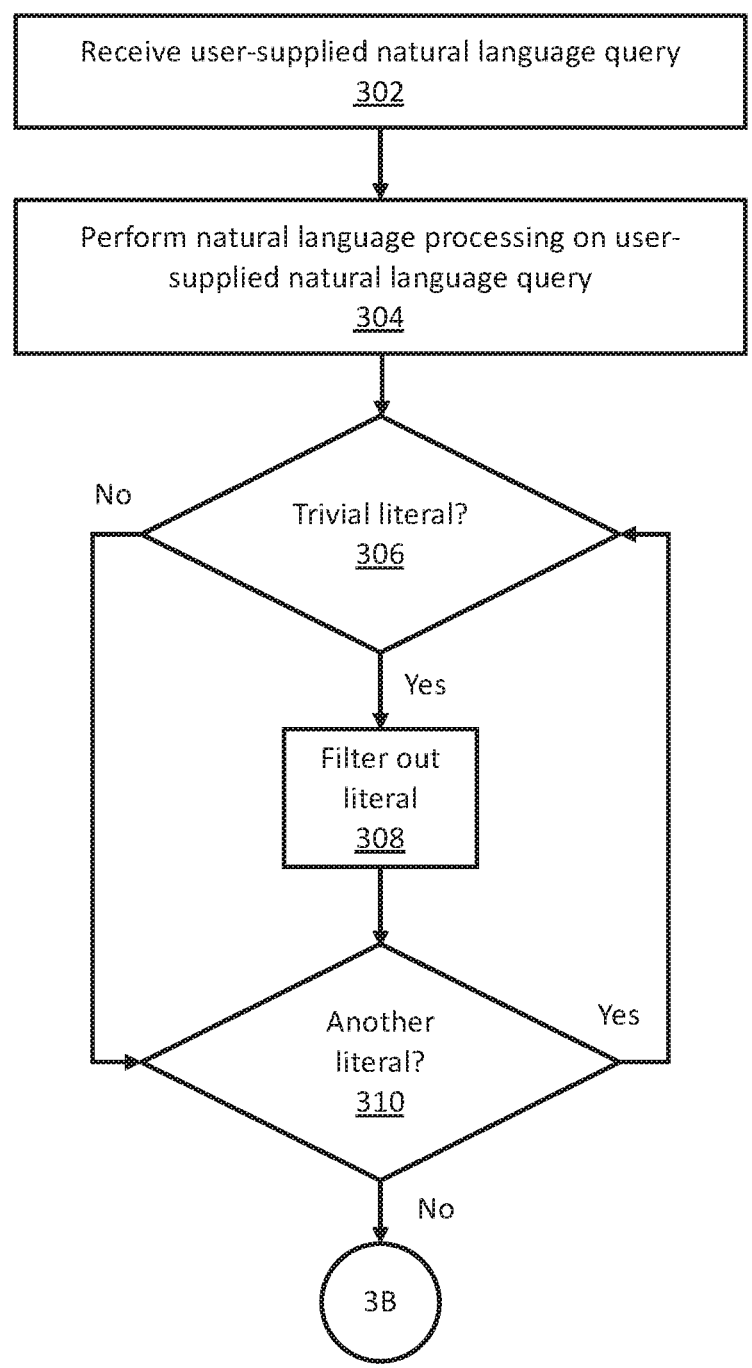
FIGS. 3A-3C illustrate a set of operations for generating a multidimensional database query in accordance with one or more embodiments.
Figure 3B:
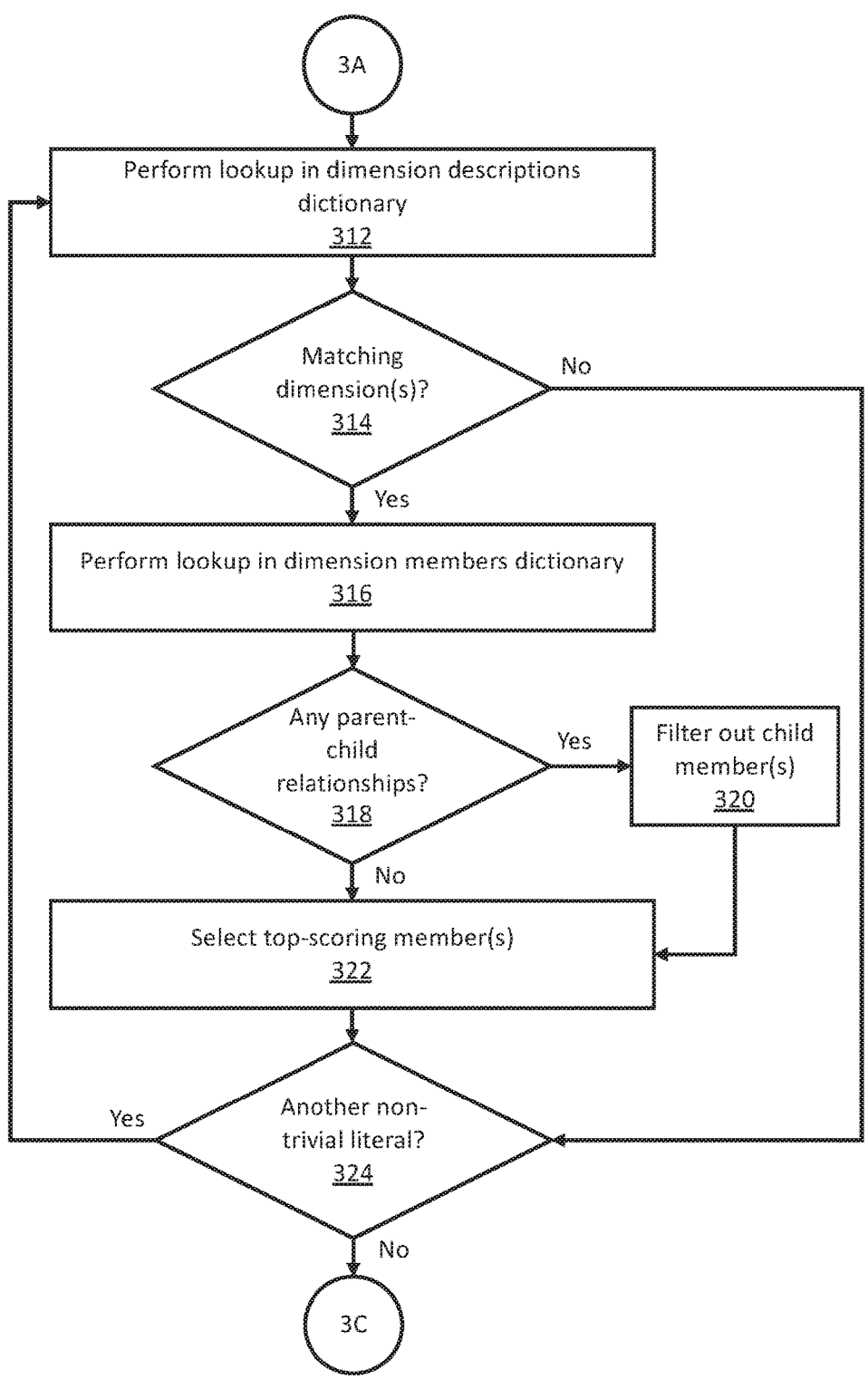
Figure 3C:
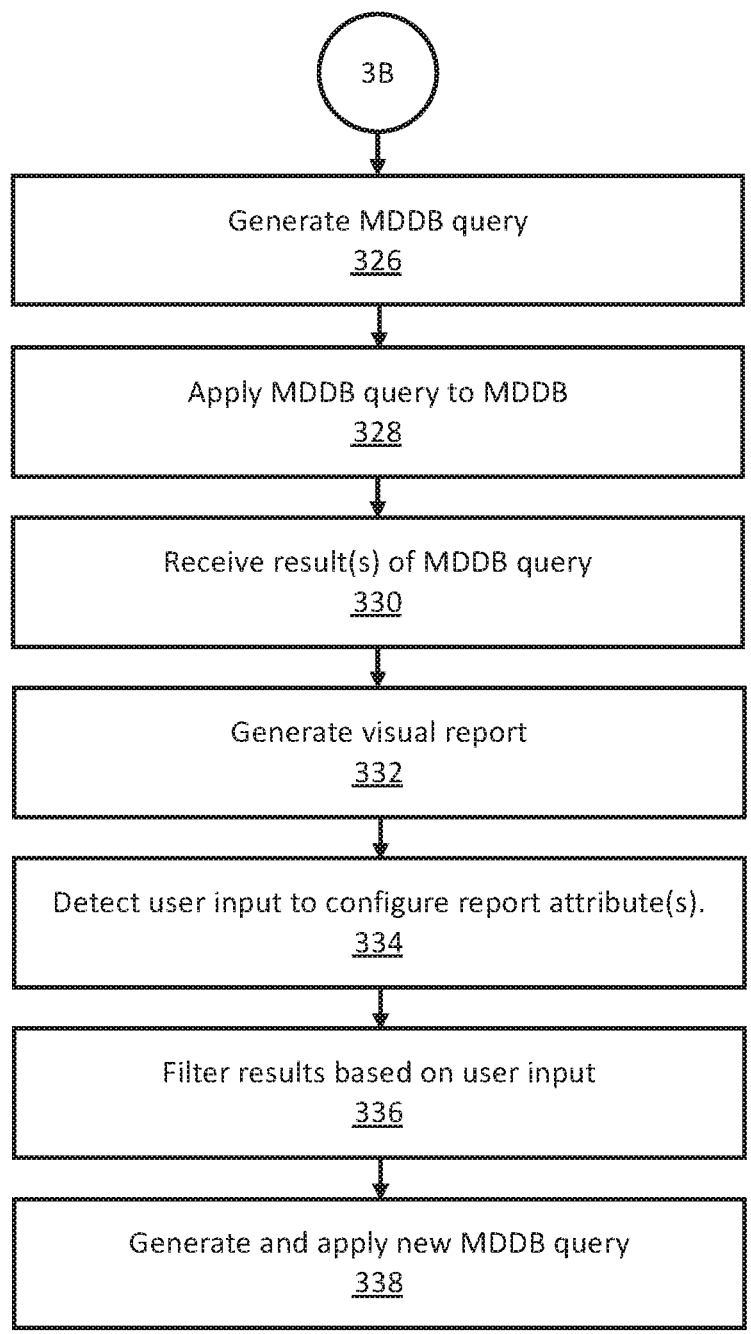

FIGS. 3A-3C illustrate an example set of operations for generating a multidimensional database query in accordance with one or more embodiments. One or more operations illustrated in FIGS. 3A-3C may be modified, rearranged, or omitted all together. Accordingly, the particular sequence of operations illustrated in FIGS. 3A-3C should not be construed as limiting the scope of one or more embodiments.

In an embodiment, a system (e.g., system 100 of FIG. 1) receives a user-supplied natural language query (Operation 302). The system may receive the user-supplied natural language query via a user interface, an application programming interface (API), and/or another interface or combination thereof configured to receive user-supplied data. In general, a user-supplied natural language query includes user-supplied text that does not conform to any particular query language syntax defined by the MDDB to which the user-supplied natural language query is directed.

In an embodiment, the system performs natural language processing on the user-supplied natural language query (Operation 304). Natural language processing may involve, for each literal in the user-supplied natural language query, generating a corresponding token, part of speech, and lemma (i.e., stemmed token).

In an embodiment, based on the natural language processing, the system determines whether a literal in the user-supplied natural language query is a trivial literal (Operation 306). For example, the system may determine that literals corresponding to particular parts of speech, such as conjunctions and/or prepositions, are trivial literals. Alternatively or in addition, the system may determine that a literal is a trivial literal because it does not have sufficient contextual significance. If the system determines that a literal is a trivial literal, the system may filter out the literal (Operation 308), i.e., not consider the literal when generating an MDDB query. The system may determine whether the user-supplied natural language query includes another literal (Operation 310) and repeat the filtering process for each literal until all literals have been evaluated as being trivial or non-trivial.

In an embodiment, for a non-filtered (i.e., non-trivial) literal/lemma, the system performs a lookup in the dimension description dictionary to determine any matching dimensions (Operation 312). A dimension matches a literal if the dimension descriptions dictionary indicates that the literal is associated with the dimension. The system may determine whether any dimension(s) match the literal (Operation 314). If the literal matches one or more dimensions in the MDDB, then the system performs a lookup in the dimension members dictionary to determine the specific member(s) of the dimension(s) that are associated with the particular literal (Operation 316).

In an embodiment, two or more members in an MDDB have a parent-child relationship, in which data associated with the parent member includes data associated with the child member. For example, in a database that stores accounting data, numbers from a child member may be 'rolled up' to the parent member. To avoid counting values more than once, the system may determine whether any members associated with a particular literal have a parent-child relationship (Operation 318) and if so, filter out the child members (Operation 320).

In an embodiment, the system compares the importance scores of the members matching the literal and selects the top-scoring member(s) (Operation 322). The top-scoring member(s) is/are the member(s) that satisfy one or more threshold criteria. The system may select a single member having the highest importance score of all the matching members. Alternatively or in addition, the system may select any member(s) with an importance score that matches or surpasses a threshold value. Many different criteria may be used to determine the top-scoring member(s) that match a particular literal.

In an embodiment, the system determines whether the user-supplied natural language query includes another non-trivial literal (Operation 324) and if so, repeats the lookup process for that literal. The system may repeat the lookup process for each non-trivial literal in the user-supplied natural language query.

In an embodiment, the system uses the top-scoring member(s) identified for each literal to generate a multidimensional database query (Operation 326). The MDDB query is in a format that satisfies a query syntax defined by the underlying MDDB. The MDDB query includes one or more clauses that reference the one or more top-scoring members for each literal.

In an embodiment, the system generates a multidimensional database query according to the following pseudocode:

```
Step 1: Get current period (based on sysdate), currency, ledger, etc. from user preferences.
Step 2: StringBuilder MDX // init MDX, assign ledger, currency, period.
Step 2: For Every Dimension
BEGIN LOOP
    MDX.append("set [ _" + Dimension);
    MDX.append("] as 'Filter(Generate({[ _" + Dimension + "]},
    [" + Dimension + "].members), ( ");
    For Every Member
    BEGIN LOOP
        If (count > 0)
            MDX.append(" OR ");
        Else
            mdx.append("([" + Dimension +
            "].CurrentMember.MEMBER_Name =
            \"" + Member+ "\" OR [" + Dimension +
            "].CurrentMember.MEMBER_ALIAS =
            \"" + Member + "\") "); count++;
    END LOOP
    MDX.append("))' ");
    count = 0;
END LOOP
Step 4: Execute MDX against Essbase
```

In an embodiment, the system applies the MDDB query to the MDDB (Operation 328). In response to the MDDB query, the MDDB supplies (and the system receives) a set of one or more results that satisfy the user-supplied natural language query (Operation 330). The set of one or more results includes data that describes one or more members of dimensions in the MDDB, according to the MDDB query.

In an embodiment, the system generates a visual report that represents one or more results of the MDDB query in a visual form (Operation 332). The visual report may include a visual representation of report attributes, showing one or more attributes or properties of the visual report. The report attribute(s) may be user-configurable. Specifically, the system may detect user input to configure the report attribute(s) (Operation 334). Responsive to detecting the user input, the system may filter the results obtained from the MDDB and modify the data displayed in the visual report accordingly (Operation 336). Alternatively, the system may generate a new MDDB query, modified according to a change in the report attributes. The system may apply the new MDDB query to the MDDB, to obtain one or more new results to display in the visual report (Operation 338).

In an embodiment, generating multidimensional database queries based on user-supplied natural language queries reduces the amount of knowledge that a user needs to query an MDDB. The user does not need to know the syntax required to write an MDDB query. In addition, a user-supplied natural language query is not constrained by the options presented in a wizard. Thus, the resulting MDDB query may provide better results (i.e., results that better satisfy the user's intent in writing the natural language query) than if the user were constrained to the options available in a wizard. In addition, when the system uses one or more dictionary data structures to match user-supplied literals with MDDB dimensions and members, the user may be able to query the MDDB without any knowledge of the MDDB's dimensions and/or other implementation details.

5. Illustrative Example

A detailed example is described below for purposes of clarity. Specifically, FIGS. 4A-4K show block diagrams that illustrate an example of generating an MDDB query in accordance with one or more embodiments. Components and/or operations described below should be understood as one specific example which may not be applicable to certain embodiments. Accordingly, components and/or operations described below should not be construed as limiting the scope of any of the claims.

Figure 4A:
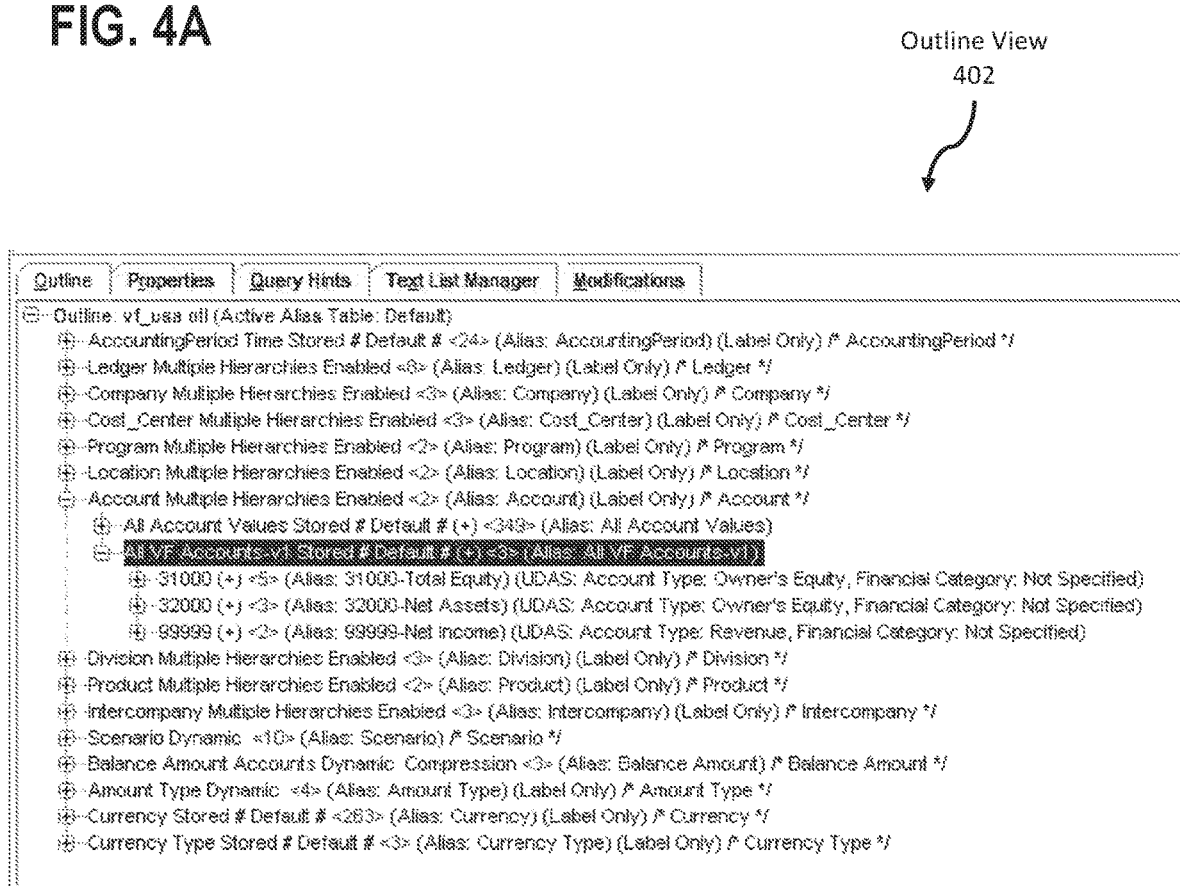

FIG. 4A illustrates an example of an outline view 402 associated with an underlying MDDB (e.g., MDDB 114 of FIG. 1), in accordance with an embodiment. The outline view 402 is a visual representation of an MDDB outline. The outline view 402 may be displayed in a graphical user interface (e.g., user interface 102 of FIG. 1). An MDDB outline is a data structure (e.g., a tree structure) that represents the relationships between dimensions and members in the underlying MDDB. The outline view 402 illustrated in FIG. 4A allows a user to visualize and navigate through different parts of the MDDB outline. For example, a user may expand and collapse branches of the outline view 402 using the [+] and [−] user interface elements. As shown in the outline view 402, the MDDB in this example includes multiple dimensions, named 'Ledger,' 'Company,' Cost_Center,' etc. In addition, the outline view 402 shows that the MDDB outline includes various metadata associated with each particular dimension, such as an alias and information about whether hierarchies are enabled for the dimension. Hierarchies indicate related levels and members within the MDDB outline. A given level may include one or more members, corresponding to data values. Alternatively or in addition, members may be arranged in a parent-child hierarchy, where one member ('parent') is above another member ('child') in the hierarchy. In the outline view 402 of this example, the 'Account' dimension and the 'All VF Accounts' sublevel have been expanded to show the members '5100,' '5200,' and '99999.'

FIG. 4B illustrates an example of a user-supplied natural language query 404 in accordance with an embodiment. In this example, the user-supplied natural language query 404 is in the form of a question, "What are my expenditures for travel and entertainment in America?" Alternatively, the user-supplied natural language query 404 may take the form of a command (e.g., "Find my expenditures for travel and entertainment in America") or a sentence fragment (e.g., "expenditures for travel and entertainment in America").

FIG. 4C shows an example of a processed natural language query 406, corresponding to a result of performing natural language processing on the user-supplied natural language query of FIG. 4B. In FIG. 4C, the word "are" has been filtered out as a trivial literal, i.e., a literal that does not have sufficient contextual significance.

Figure 4D:
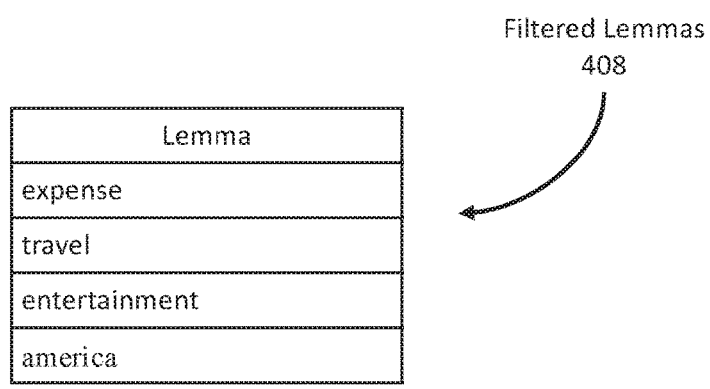

FIG. 4D illustrates an example of filtered lemmas 408, which are the non-trivial lemmas remaining after filtering out trivial literals based on the processed natural language query 406. In this example, only the lemmas corresponding to nouns (i.e., expense, travel, entertainment, and america) have been retained.

Figure 4E:
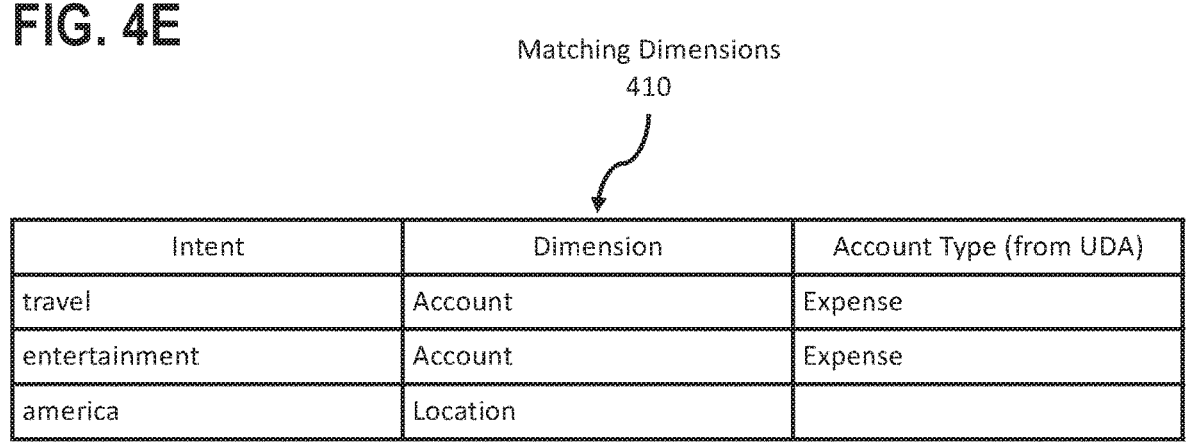

FIG. 4E illustrates matching dimensions 410 for the filtered lemmas 408 of FIG. 4D, based on a lookup in a dimension description dictionary. In this example, no matching dimensions were found for the literal "expense." The dimension "Account" (having an account type of "expense," based on a user-defined attribute associated with the dimension) matches the "travel" and "entertainment" literals. The dimension "location," which does not have an account type, matches the literal "america."

FIG. 4F illustrates a set of matching members 412 for the literal "travel," based on a lookup in a dimension members dictionary, including the importance scores associated with each literal-to-member mapping. In the set of matching members 412 for the literal "travel," members 53450, 53440, 53456, and 53430 are all child members of member 53000. After filtering out child members, the set of parent members 414 for the literal "travel" includes only member 53000.

Figure 4G:
Figure 4G:

FIG. 4G illustrates a set of matching members 416 for the literal "entertainment." In this example, member 52388 is a child member of member 53000. After filtering out child members, the set of parent members 418 for the literal "entertainment" includes only member 53000.

Figure 4H:
Figure 4H:

FIG. 4H illustrates a set of matching members 420 for the literal "america." In this example, member 1000 and member 2000 do not have a parent-child relationship. Both members may be considered parent members without any children in the set of matching members 420. The set of parent members 422 for the literal "america" retains both member 1000 and member 2000.

Figure 4I:

FIG. 4I shows the set of top-scoring members 424 for each literal, based on comparisons of importance scores associated with the sets of parent members illustrated in FIGS. 4F, 4G, and 4H. In this example, for the literal "location," member 1000 and member 2000 have the same importance score. If two members have matching importance scores, both may be considered top-scoring members.

FIG. 4J illustrates a multidimensional database query 426 in multidimensional expression (MDX) format, based on the top-scoring members for each literal in this example. Specifically, pursuant to the discussion of FIGS. 4A-4I above, the MDDB query 426 is an MDX query designed to return a result corresponding to the user-supplied natural language query 404 of FIG. 4A.

Figure 4K:
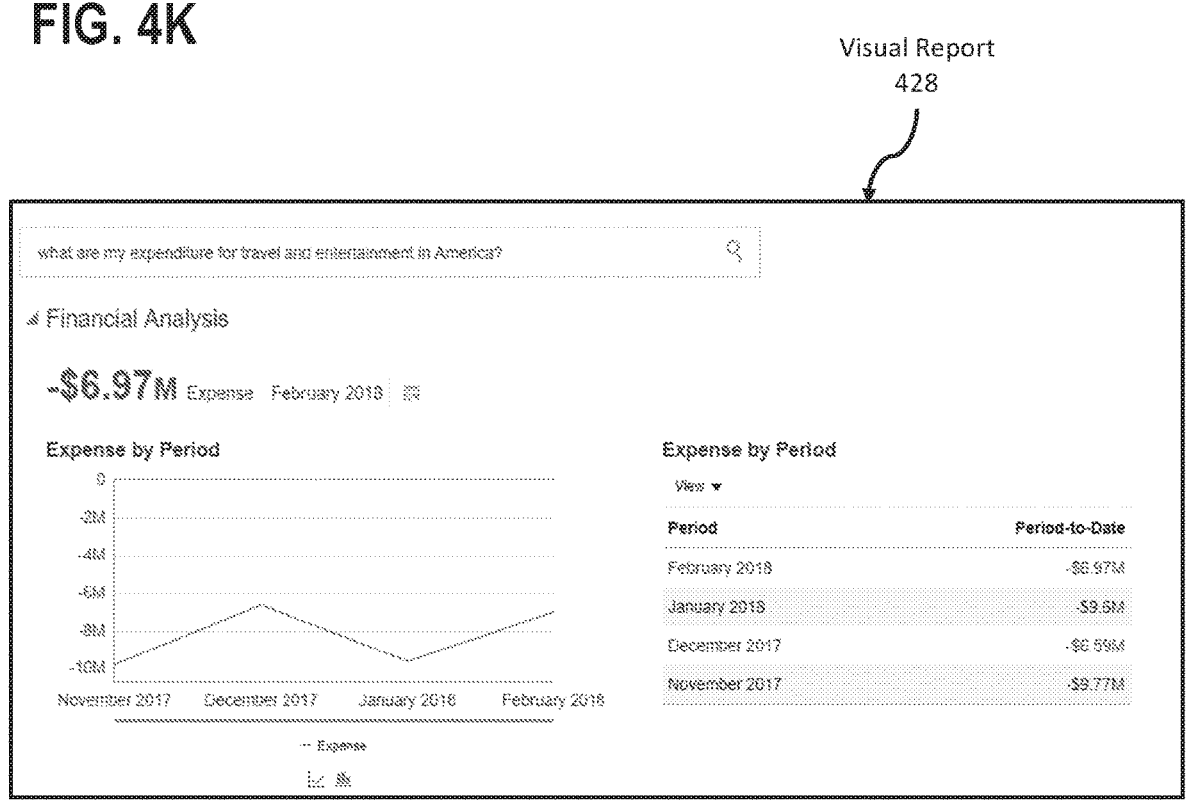

FIG. 4K illustrates an example of a visual report 428 that represents results of applying the MDDB query 426 of FIG. 4J. In the report attributes 430 of FIG. 4K, a user may configure the visual report 428 to show data for North America, South America, or both. When a user configures the report attributes 430, the system may filter the results obtained from the MDDB and modify the data displayed in the visual report accordingly. Alternatively, the system may generate a new MDDB query, modified according to a change in the report attributes 430. The system may apply the new MDDB query to the MDDB, to obtain one or more new results to display in the visual report 428.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
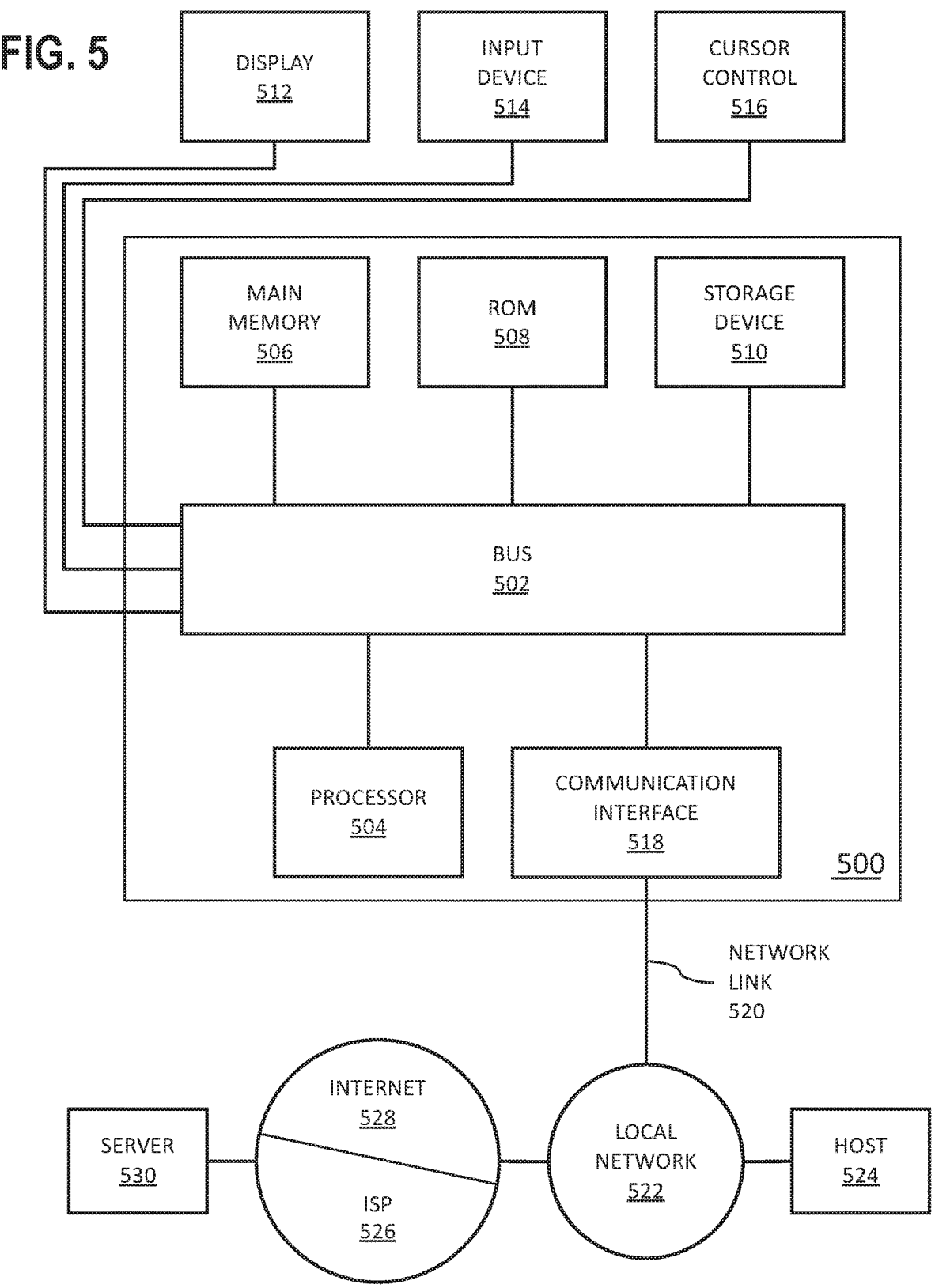
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), plasma display, electronic ink display, cathode ray tube (CRT) monitor, or any other kind of device for displaying information to a computer user. An input device 514, including alphanumeric and other keys, may be coupled to bus 502 for communicating information and command selections to processor 504. Alternatively or in addition, the computer system 500 may receive user input via a cursor control 516, such as a mouse, a trackball, a trackpad, a touchscreen, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. The display 512 may be configured to receive user input via one or more pressure-sensitive sensors, multi-touch sensors, and/or gesture sensors. Alternatively or in addition, the computer system 500 may receive user input via a microphone, video camera, and/or some other kind of user input device (not shown).

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 500 can receive the data from the network and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link. a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more hardware processors, cause the one or more hardware processors to perform a method for generating a multidimensional database query from a user-supplied natural language query, the method comprising:
   extracting a first user-supplied literal from the user-supplied natural language query that comprises a plurality of literals, each literal being a discrete word in the user-supplied natural language query;
   determining that the first user-supplied literal is associated with a first dimension of a plurality of dimensions in a multidimensional database by performing a first lookup of the first user-supplied literal in one or more dictionary data structures associated with the multidimensional database based on a first mapping in the one or more dictionary data structures,
      wherein the first mapping maps the first dimension to a first set of one or more literals that each are associated, respectively, with at least one member of the first dimension, each member being a particular data value within the multidimensional database;
   determining that the first user-supplied literal is associated with a first particular member of the first dimension by performing a second lookup of the first user-supplied literal and the first dimension in the one or more dictionary data structures based on a second mapping in the one or more dictionary data structures,
      wherein the second mapping maps each particular literal in the first set of one or more literals to one or more particular members of the first dimension that are associated with the particular literal in the first set of one or more literals; and
   generating a multidimensional database query that comprises a first query clause that references the first particular member of the first dimension.

2. The one or more media of claim 1, wherein the method further comprises:
   generating the one or more dictionary data structures.

3. The one or more media of claim 2, wherein generating the one or more dictionary data structures comprises:
   generating the first mapping;
   generating the second mapping;
   generating a third mapping that maps a second dimension in the plurality of dimensions to a second set of one or more literals that each are associated, respectively, with at least one member of the second dimension; and
   generating a fourth mapping that maps each particular literal in the second set of one or more literals to one or more particular members of the second dimension that are associated with the particular literal in the second set of one or more literals.

4. The one or more media of claim 3, wherein the one or more dictionary data structures comprises:
   a first dictionary data structure comprising the first mapping and the third mapping; and
   a second dictionary data structure comprising the second mapping and the fourth mapping.

5. The one or more media of claim 3, wherein generating the first mapping comprises:
   obtaining a plurality of literals from metadata associated with a plurality of members of the first dimension;
   filtering out one or more trivial literals from the plurality of literals to obtain a plurality of non-trivial literals, each trivial literal being a part of speech other than a noun or a verb; and
   storing, in the one or more dictionary data structures, the plurality of non-trivial literals as the first set of one or more literals.

6. The one or more media of claim 5, wherein the metadata associated with the plurality of members of the first dimension comprises at least one or more member names and one or more user-defined attributes of the plurality of members.

7. The one or more media of claim 1, wherein the method further comprises:
   applying the multidimensional database query to the multidimensional database, to obtain one or more results of the user-supplied natural language query; and
   generating a visual report comprising the one or more results of the user-supplied natural language query.

8. The one or more media of claim 7, wherein the method further comprises:
   receiving user input to modify one or more report attributes associated with the visual report; and
   based on the user input: modifying the visual report.

9. The one or more media of claim 1, wherein extracting the first user-supplied literal from the user-supplied natural language query comprises filtering out one or more trivial literals from the user-supplied natural language query.

10. The one or more media of claim 1, wherein the method further comprises:
    extracting a second user-supplied literal from the user-supplied natural language query;
    determining that the second user-supplied literal is associated with a second dimension of the plurality of dimensions by performing a third lookup of the second user-supplied literal in the one or more dictionary data structures based on a third mapping in the one or more dictionary data structures,
       wherein the third mapping maps the second dimension to a second set of one or more literals that each are associated, respectively, with at least one member of the second dimension; and
    determining that the second user-supplied literal is associated with a particular member of the second dimension by performing a fourth lookup of the second user-supplied literal and the second dimension in the one or more dictionary data structures based on a fourth mapping in the one or more dictionary data structures,
       wherein the fourth mapping maps each particular literal in the second set of one or more literals to one or more particular members of the second dimension that are associated with the particular literal in the second set of one or more literals,
    wherein generating the multidimensional database query further comprises generating a second query clause that references the particular member of the second dimension.

11. The one or more media of claim 1, wherein the method further comprises:

determining that the first user-supplied literal is associated with a second particular member of the first dimension;

determining that the second particular member of the first dimension is a child member of the first particular member of the first dimension, wherein data associated with the first particular member of the first dimension comprises data associated with the second particular member of the first dimension; and based on determining that the second particular member of the first dimension is the child member of the first particular member of the first dimension: excluding the second particular member of the first dimension from the multidimensional database query.

12. The one or more media of claim 1, wherein the one or more dictionary data structures comprises a corresponding importance score associated with the first user-supplied literal and the first particular member of the first dimension.

13. The one or more media of claim 12, wherein the corresponding importance score is a ratio of (a) a number of occurrences of the first user-supplied literal in metadata associated with the first particular member of the first dimension to (b) a total number of literals in the metadata associated with the first particular member of the first dimension.

14. The one or more media of claim 12, wherein the method further comprises:

determining, before generating the multidimensional database query, that the corresponding importance score satisfies a threshold criterion.

15. The one or more media of claim 14, wherein determining that the corresponding importance score satisfies the threshold criterion comprises determining that the corresponding importance score is a highest importance score of a plurality of importance scores associated, respectively, with a plurality of members associated with the first user-supplied literal.

16. The one or more media of claim 1, wherein extracting the first user-supplied literal from the user-supplied natural language query performing natural language comprises determining, for each literal in the user-supplied natural language query, a corresponding token, a corresponding part of speech, and a corresponding lemma.

17. The one or more media of claim 1, wherein the multidimensional database does not comprise any relational database tables.

18. The one or more media of claim 1, wherein the multidimensional database comprises one or more relational database tables.

19. A system comprising:

at least one device including a hardware processor; and at least one non-transitory machine-readable medium storing instructions which, when executed by the hardware processor, causes the hardware processor to perform a method for generating a multidimensional database query from a user-supplied natural language query, the method comprising:

receiving the user-supplied natural language query comprising a plurality of literals, each literal being a discrete word in the user-supplied natural language query;

extracting a first user-supplied literal from the user-supplied natural language query;

determining that the first user-supplied literal is associated with a first dimension of a plurality of dimensions in a multidimensional database by performing a first lookup of the first user-supplied literal in one or more dictionary data structures associated with a multidimensional database based on a first mapping in the one or more dictionary data structures, wherein the first mapping maps the first dimension to a first set of one or more literals that each are associated, respectively, with at least one member of the first dimension, each member being a particular data value within the multidimensional database;

determining that the first user-supplied literal is associated with a first particular member of the first dimension by performing a second lookup of the first user-supplied literal and the first dimension in the one or more dictionary data structures based on a second mapping in the one or more dictionary data structures, wherein the second mapping maps each particular literal in the first set of one or more literals to one or more particular members of the first dimension that are associated with the particular literal in the first set of one or more literals; and generating a multidimensional database query that comprises a first query clause that references the first particular member of the first dimension.

20. A method for generating a multidimensional database query from a user-supplied natural language query, the method comprising:

generating one or more dictionary data structures associated with a multidimensional database;

receiving the user-supplied natural language query comprising a series of literals, each literal being a discrete word in the user-supplied natural language query;

extracting a first user-supplied literal from the user-supplied natural language query that comprises a plurality of literals, each literal being a discrete word in the user-supplied natural language query, wherein extracting the first user-supplied literal from the user-supplied natural language query comprises filtering out one or more trivial literals from the user-supplied natural language query, each trivial literal being other than a noun or a verb, and wherein extracting the first user-supplied literal from the user-supplied natural language query comprises determining, for each literal in the user-supplied natural language query, a corresponding token, a corresponding part of speech, and a corresponding lemma;

extracting a second user-supplied literal from the user-supplied natural language query;

determining that the first user-supplied literal is associated with a first dimension of a plurality of dimensions in the multidimensional database by performing a first lookup of the first user-supplied literal in the one or more dictionary data structures based on a first mapping in the one or more dictionary data structures, wherein the first mapping maps the first dimension to a first set of one or more literals that each are associated, respectively, with at least one member of the first dimension, each member being a particular data value within the multidimensional database;

determining that the first user-supplied literal is associated with a first particular member of the first dimension by performing a second lookup of the first user-supplied literal and the first dimension in the one or more dictionary data structures based on a second mapping in the one or more dictionary data structures, wherein the second mapping maps each particular literal in the first set of one or more literals to one or more particular members of the first dimension that are associated with the particular literal in the first set of one or more literals;

determining that the second user-supplied literal is associated with a second dimension of the plurality of dimensions by performing a third lookup of the second user-supplied literal in the one or more dictionary data structures based on a third mapping in the one or more dictionary data structures, wherein the third mapping maps the second dimension to a second set of one or more literals that each are associated, respectively, with at least one member of the second dimension;

determining that the second user-supplied literal is associated with a particular member of the second dimension by performing a fourth lookup of the second user-supplied literal and the second dimension in the one or more dictionary data structures based on a fourth mapping in the one or more dictionary data structures, wherein the fourth mapping maps each particular literal in the second set of one or more literals to one or more particular members of the second dimension that are associated with the particular literal in the second set of one or more literals;

determining that the first user-supplied literal is associated with a second particular member of the first dimension;

determining that the second particular member of the first dimension is a child member of the first particular member of the first dimension, wherein data associated with the first particular member of the first dimension comprises data associated with the second particular member of the first dimension;

based on determining that the second particular member of the first dimension is the child member of the first particular member of the first dimension: excluding the second particular member of the first dimension from the multidimensional database query;

generating a multidimensional database query that comprises a first query clause that references the first particular member of the first dimension and a second query clause that references the particular member of the second dimension;

applying the multidimensional database query to the multidimensional database, to obtain one or more results of the user-supplied natural language query;

generating a visual report comprising the one or more results of the user-supplied natural language query;

receiving user input to modify one or more report attributes associated with the visual report; and based on the user input: modifying the visual report, wherein generating the one or more data structures comprises:

generating the first mapping, wherein generating the first mapping comprises:

obtaining a plurality of literals from metadata associated with a plurality of members of the first dimension, wherein the metadata associated with the plurality of members of the first dimension comprises at least one or more member names and one or more user-defined attributes of the plurality of members;

filtering out one or more trivial literals from the plurality of literals to obtain a plurality of non-trivial literals, each trivial literal being a part of speech other than a noun or a verb; and storing, in the one or more dictionary data structures, the plurality of non-trivial literals as the first set of one or more literals;

generating the second mapping;
generating the third mapping; and
generating the fourth mapping, wherein the one or more dictionary data structures comprises:

a first dictionary data structure comprising the first mapping and the third mapping;

a second dictionary data structure comprising the second mapping and the fourth mapping;

a corresponding importance score associated with the first user-supplied literal and the first particular member of the first dimension, wherein the corresponding importance score is a ratio of (a) a number of occurrences of the first user-supplied literal in metadata associated with the first particular member of the first dimension to (b) a total number of literals in the metadata associated with the first particular member of the first dimension, wherein the method further comprises:

determining, before generating the multidimensional database query, that the corresponding importance score satisfies a threshold criterion comprising determining that the corresponding importance score is a highest importance score of a plurality of importance scores associated, respectively, with a plurality of members associated with the first user-supplied literal, wherein the multidimensional database does not comprise any relational database tables, wherein the method is performed by at least one device comprising a hardware processor.

* * * * *